C. Guidet,

Pavement.

No. 4106. Reissued Aug. 23. 1870.

Witnesses:
C. Wahlers.
E. Bilhuber

Inventor:
Charles Guidet
By Van Santvoord & Hauff
his attys

UNITED STATES PATENT OFFICE.

CHARLES GUIDET, OF NEW YORK, N. Y.

IMPROVEMENT IN STONE PAVEMENT.

Specification forming part of Letters Patent No. 85,814, dated January 12, 1869; reissue No. 4,106, dated August 23, 1870.

*To all whom it may concern:*

Be it known that I, CHARLES GUIDET, of the city, county, and State of New York, have invented a new and Improved Stone Pavement; and I do hereby declare the following to be a full, clear, and exact description thereof, which will enable those skilled in the art to make and use the same, reference being had to the accompanying drawings forming part of this specification, in which drawings—

Figure 1:
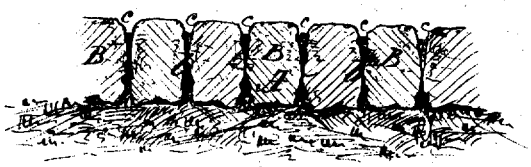
Figure 2:
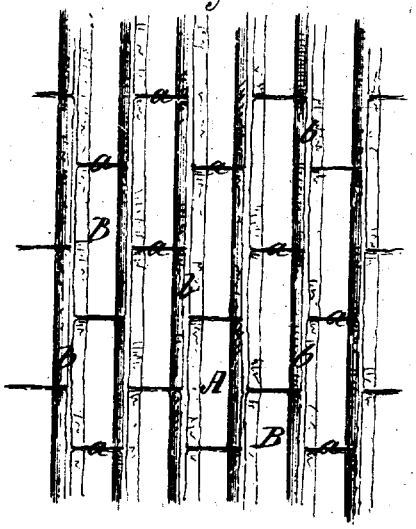

Figure 1 represents a longitudinal section of this invention. Fig. 2 is a plan or top view thereof.

Similar letters indicate corresponding parts.

This invention relates to a pavement composed of stone blocks, which are made in the form of parallelopipeds, and the surfaces of which are so prepared that the blocks, when placed together, will form close joints in the direction parallel with the sides of the streets, or in a longitudinal direction, while the joints running transversely to the street remain open at the top, and thereby a pavement is obtained which offers a good foot-hold for the draft animals, and at the same time a smooth surface for the wheels passing over the same.

The edges of the blocks adjacent to the transverse open joints may be chamfered off, so as to insure a good foot-hold for the draft animals.

In the drawings, the letter A designates a section of my pavement, which is composed of a series of stone blocks, B. These blocks are cut in the form of parallelopipeds, and they are so prepared that the same, when put down on the street, will form close joints in a longitudinal direction, or parallel with the sides of the street, and open joints in a direction transversely to the street. To effect this purpose, the narrow ends *a* of my blocks are cut smooth, so that the joints between adjoining blocks are close, and the broad sides or surfaces *b* of my blocks are left rugged, or cut so that the joints between adjoining blocks will be open. The top edges *c* of these broad sides may be chamfered off, as shown in the drawings.

If a street is paved with truncated pyramids, as used in the Russ or Belgian pavement, close joints are formed on the top surface of the pavement both in a longitudinal and in a transverse direction, and said surface offers no foot-hold to the draft animals passing over the same; but, by placing a series of my blocks B together, as shown in Fig. 2, close joints are formed in a longitudinal direction, and open joints in a transverse direction, and a stone pavement is obtained which offers a firm foot-hold to the draft animals, while it presents a comparatively smooth surface to the wheels of vehicles passing over it, and at the same time each block is firmly retained in position by the adjoining blocks, without requiring any intermediate layers of stone or other material.

The interstices between the rugged surfaces of the blocks are filled with sand, whereby the firmness and solidity of the pavement are still further increased.

I am aware that pavements have been produced of blocks made in the form of parallelopipeds; but, in order to produce open transverse joints, it was found necessary to interpose between the adjoining blocks thin strips of wood or stone.

I do not claim broadly, therefore, a pavement composed of blocks made in the form of parallelopipeds; but

What I claim as new, and desire to secure by Letters Patent, is—

A pavement composed of stone blocks made in the form of parallelopipeds, having their narrow edges or ends cut smooth, and their broad sides purposely cut rugged or uneven, when the blocks are arranged with their rugged surfaces transversely to the street, substantially as described.

Witnesses: CHARLES GUIDET.

W. HAUFF,

C. WAHLERS.